United States Patent [19]

Takahashi et al.

[11] Patent Number: 4,785,421
[45] Date of Patent: Nov. 15, 1988

[54] NORMALIZING CIRCUIT

[75] Inventors: Toshiya Takahashi; Junichi Iwasaki, both of Tokyo, Japan

[73] Assignee: NEC Corporation, Tokyo, Japan

[21] Appl. No.: 54,119

[22] Filed: May 26, 1987

Related U.S. Application Data

[63] Continuation of Ser. No. 614,911, May 29, 1984, abandoned.

[30] Foreign Application Priority Data

May 25, 1983 [JP]  Japan .................................. 58-91788

[51] Int. Cl.$^4$ ............................................... G06F 7/38
[52] U.S. Cl. ................................................. 364/715.04
[58] Field of Search ................................. 364/715, 748

[56] References Cited

U.S. PATENT DOCUMENTS

| | | | |
|---|---|---|---|
| 3,234,368 | 2/1966 | Kregness | 364/748 |
| 3,678,259 | 7/1972 | Kyser | 364/715 |
| 3,831,012 | 8/1974 | Tate et al. | 364/748 |
| 4,064,421 | 12/1977 | Gajski et al. | 364/715 |
| 4,383,304 | 5/1983 | Hirashima | 364/715 |
| 4,528,640 | 7/1985 | Criswell | 364/748 |
| 4,553,220 | 11/1985 | Swanson | 364/715 |

Primary Examiner—David H. Malzahn
Attorney, Agent, or Firm—Sughrue, Mion, Zinn, Macpeak and Seas

[57] ABSTRACT

A normalizing circuit is disclosed which can make bit shift operation for a bit string. The normalizing circuit has a leading "one" detector, an encoder and a bit shifter. The leading "one" detector detects a bit position of a leading "one" among a bit string and produces a signal to indicate the bit position of the leading "one". The encoder produces a control signal by which bit shift operation is executed. The bit shifter has a plurality of shift paths to shift leftwardly or rightwardly the bit string such that the leading "one" bit is positioned at the most left position or the most right position. One of the plurality of shift paths is selected by the control signal produced by the encoder. Thus, bit shift operation of the leading "one" bit can be executed at a high speed.

16 Claims, 5 Drawing Sheets

NORMALIZING CIRCUIT

This is a continuation of application Ser. No. 614,911, filed May 29, 1984, now abandoned.

BACKGROUND OF THE INVENTION

1. Field of the Invention

The present invention relates to a normalizing circuit used in a digital processor in which binary data is manipulated, and more particularly to a normalizing circuit used in an arithmetic computing apparatus to execute a binary floating point operation.

2. Description of the Prior Art

A digital processor manipulates a bit string consisting of a group of binary data "zeros" and "ones". Particularly, in an arithmetic operation, a bit shift operation of the bit string is usually required. The bit shift operation typically is used in a floating point arithmetic operation to raise the precision of the arithmetic operation and is executed by a normalizing circuit having a bit shifter (e.g. a shift register). The normalizing circuit is used to take off "zeros" from the upper bit portion of a mantissa. That is, in floating point operation, a binary data "one" must be positioned at a leading bit (MSB) of the mantissa. The bit shifter used in the normalizing circuit shifts a bit string of the mantissa leftwardly such that a leading "one" of the mantissa is positioned at a most left-hand side bit. This shift operation has been executed by software in the prior art. Namely, a bit string of a mantissa is shifted leftward one bit by one bit according to a shift clock and is checked whether the left-most bit is "one" or "zero" in every bit shift operation. Therefore, a very long period is required until a leading "one" of the mantissa is positioned at the left most side. The drawback of this technique is most significant when a long bit string is computed. Since a long bit string (e.g. eighty bits/a word), in general, is used in a highpower floating point processor, a very long time must elapse before a normalizing operation can be completed. Therefore, minimizing the normalizing operation is most important in obtaining high speed processing. Further, the normalizing operation containing a bit shift operation is required not only in the floating point processor but also in many other digital processors such as an image processor, a sound processor and the like.

SUMMARY OF THE INVENTION

An object of the present invention is to provide a normalizing circuit having a high speed bit shifter.

Another object of the present invention is to provide a normalizing circuit adaptable to floating point computing apparatus.

A further object of the present invention is to provide a normalizing circuit being capable of detecting a leading "one" or "zero" among a bit string at a high speed.

A normalizing circuit according to the present invention has a leading "one" detecting circuit, an encoder circuit and a bit shifter circuit. The leading "one" detecting circuit receives a bit string having a plurality of binary bits and detects the bit position of a leading "one" among the received bit string. The result of the detection is sent to the encoder as code data designating the bit position of the detected leading "one". The encoder produces a control signal according to the code data from the encoder circuit. The bit shifter circuit has a plurality of paths through which an arbitrary bit of the bit string is shifted at the most left portion. These paths are formed such that the remaining bit or bits following the arbitrary bit are simultaneously shifted together with the arbitrary bit. The control signal from the encoder is applied to the bit shifter for selecting one of said plurality of paths.

According to the present invention, the bit, at which a leading "one" has been set, and the following bit or bits are simultaneously shifted to the left-most position and the following positions, respectively, through the selected path by means of the control signal. Therefore, since normalizing according to the present invention is executed by only a single operation according to a control signal, high speed processing can be established.

According to a preferred embodiment as described below, the leading "one" detecting circuit is constructed such that each bit of a bit string is received in parallel and a specific signal is presented only at the output end corresponding to the bit of the leading "one". A number of bits to be shifted may be defined by the output position at which the specific signal has been presented. The encoder includes a table in which a plurality of data indicating the numer of bits to be shifted are prestored, and the table is accessed by the specific signal. The encoder outputs the accessed data as the control signal. The bit shifter has a first register wherein a bit string to be normalized is set, a second register to which a normalized bit string is set and a plurality of paths wired therebetween to shift the bit string of the first register. One of these paths is selected by the control signal. According to the present invention, a selected path is to shift simultaneously the entire bit string of the first register leftwardly by only the number of bits designated by the specific signal. Thus, the bit shifter circuit is provided as a variable bit length shifter and can shift a bit string at a high speed in response to only one control signal application.

DETAILED DESCRIPTION OF THE PREFERRED EMBODIMENTS

Figure 1:
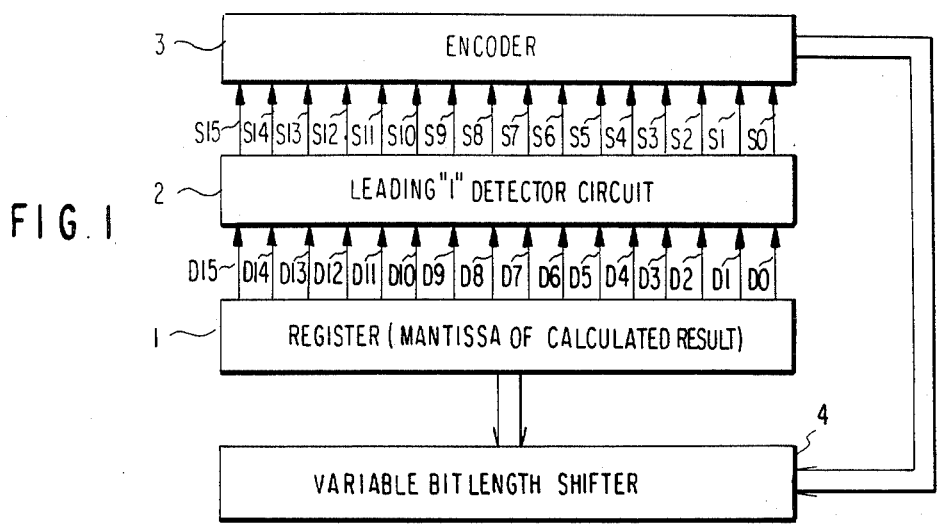
FIG. 1 is a block diagram of a normalizing circuit according to an embodiment of the present invention.

First, the step for calculating binary floating points will be described below briefly. A format of value N represented by binary floating points is, usually, divided into an exponent part and a mantissa part as tabulated below.

TABLE 1

| Exponent | Mantissa |

TABLE 1-continued (N = m · $2^e$, m: mantissa, e: exponent)

Normalization is used to expand effective digits to a maximum degree within the format of a given mantissa, i.e., to leftwardly shift the mantissa such that the most significant bit (hereinafter referred to as MSB) of the mantissa will become "one" that is "1". Described below is an example of subtraction among the calculations of floating points. A series of operations will be described below with reference to the case of the mantissa consisting of 5 bits. Here, B=15.5 is subtracted from A=18 having decimal notation. In terms of binary notation, A and B can be represented as A=1.0010×$2^4$ and B=1.1111×$2^3$, respectively. The arithmetic operation sequence is as follows:

(1) Shifting

Exponents of A and B are compared with regard to which is larger. The exponent of B which is smaller is shifted so as to become equal to the exponent of A. In this case, the shifting is effected such that B=1.1111×$2^3$→0.11111×$2^4$, and the position of decimal point of the mantissa of B is leftwardly shifted by one bit.

(2) Execution of subtraction

Subtraction is effected concerning the mantissa of A and B to obtain (mantissa of A)−(mantissa of B)=1.0010−0.11111=0.00101.

(3) Normalization of calculated result

The calculated result "0.00101×$2^4$" now will be normalized. That is, the shifting is effected by 3 bits leftwardly, so that the MSB of mantissa becomes "1". Accordingly, the exponent assumes a value 4−3=1, and the normalized value becomes "1.0100×$2^1$". In terms of decimal notation, the value is 2.5.

Thus, to effect the subtraction between the two values A and B represented by binary floating points, dissimilar exponents must first be adjusted so as to become equal to each other prior to executing the subtraction between the mantissa, and the calculated result or difference must be normalized after the subtraction has been executed. This also holds true for another arithmetic calculations, for example addition. That is, the pre-treatment called "shifting" and the after-treatment called "normalization" must be carried out.

According to conventional normalizing circuits, use is made of a hardware having shift register to effect the shifting leftwardly by one bit, and the leftward shifting is effected repetitively while checking whether the MSB of the mantissa is a "1" or not. With this normalizing operation, however, the checking and shifting operation must be repeated by a number of bits "0" continuing from the MSB to a leading "1" bit in mantissa, and a very long time is required until the normalization is completed. Since the normalization of the mantissa is indispensible for the floating point calculation, it is essential to carry out the normalization at a high speed. No matter how quickly the pre-treatment and the arithmetic operation are carried out, the speed of the floating point calculation is decreased as a whole, because the normalization is performed requiring extended periods of time.

In view of the above-mentioned problem, the present invention provides a normalizing circuit capable of carrying out the normalizing operation at a high speed.

FIG. 1 is a block diagram of a normalizing circuit according to an embodiment of the present invention, in which the mantissa of floating point has a length of 16 bits to facilitate understanding of its operation.

First, the mantissa having a length of 16 bits ($D_0$ to $D_{15}$) to be normalized is stored in a register 1. A leading "1" detector circuit 2 for detecting a code bit "1" closest to the MSB inclusive of the MSB of the register 1, receives data $D_{15}$, $D_{14}$, - - - , $D_0$ of bits sent from the register 1 in parallel. Namely, the leading "1" detector circuit detects a leading "1" which is closest to the MSB inclusive of MSB, and activates one of the corresponding output lines $S_{15}$ to $S_0$. Table 2 shows the relation between the above-mentioned data $D_{15}$, $D_{14}$, - - - , $D_0$ and the output lines $S_{15}$ to $S_0$ that are activated responsive thereto.

TABLE 2

| $D_{15}$ | $D_{14}$ | $D_{13}$ | $D_{12}$ | $D_{11}$ | $D_{10}$ | $D_9$ | $D_8$ | $D_7$ | $D_6$ | $D_5$ | $D_4$ | $D_3$ | $D_2$ | $D_1$ | $D_0$ | Active lines | Encoder outputs | Shift number (bits) |
|---|---|---|---|---|---|---|---|---|---|---|---|---|---|---|---|---|---|---|
| 1 | — | — | — | — | — | — | — | — | — | — | — | — | — | — | — | S15 | 0000 | 0 |
| 0 | 1 | — | — | — | — | — | — | — | — | — | — | — | — | — | — | S14 | 0001 | 1 |
| 0 | 0 | 1 | — | — | — | — | — | — | — | — | — | — | — | — | — | S13 | 0010 | 2 |
| 0 | 0 | 0 | 1 | — | — | — | — | — | — | — | — | — | — | — | — | S12 | 0011 | 3 |
| 0 | 0 | 0 | 0 | 1 | — | — | — | — | — | — | — | — | — | — | — | S11 | 0100 | 4 |
| 0 | 0 | 0 | 0 | 0 | 1 | — | — | — | — | — | — | — | — | — | — | S10 | 0101 | 5 |
| 0 | 0 | 0 | 0 | 0 | 0 | 1 | — | — | — | — | — | — | — | — | — | S9 | 0110 | 6 |
| 0 | 0 | 0 | 0 | 0 | 0 | 0 | 1 | — | — | — | — | — | — | — | — | S8 | 0111 | 7 |
| 0 | 0 | 0 | 0 | 0 | 0 | 0 | 0 | 1 | — | — | — | — | — | — | — | S7 | 1000 | 8 |
| 0 | 0 | 0 | 0 | 0 | 0 | 0 | 0 | 0 | 1 | — | — | — | — | — | — | S6 | 1001 | 9 |
| 0 | 0 | 0 | 0 | 0 | 0 | 0 | 0 | 0 | 0 | 1 | — | — | — | — | — | S5 | 1010 | 10 |
| 0 | 0 | 0 | 0 | 0 | 0 | 0 | 0 | 0 | 0 | 0 | 1 | — | — | — | — | S4 | 1011 | 11 |
| 0 | 0 | 0 | 0 | 0 | 0 | 0 | 0 | 0 | 0 | 0 | 0 | 1 | — | — | — | S3 | 1100 | 12 |
| 0 | 0 | 0 | 0 | 0 | 0 | 0 | 0 | 0 | 0 | 0 | 0 | 0 | 1 | — | — | S2 | 1101 | 13 |
| 0 | 0 | 0 | 0 | 0 | 0 | 0 | 0 | 0 | 0 | 0 | 0 | 0 | 0 | 1 | — | S1 | 1110 | 14 |
| 0 | 0 | 0 | 0 | 0 | 0 | 0 | 0 | 0 | 0 | 0 | 0 | 0 | 0 | 0 | 1 | S0 | 1111 | 15 |

The output lines $S_{15}$ to $S_0$ from the leading "1" detector circuit 2 are applied to an encoder 3, and an output line which is activated provides a code that corresponds to a bit position. The code is so selected as will be adapted to controlling the number of shifts of a variable bit length shifter 4 which is capable of leftwardly shifting the bits by any number indicated by the code. According to this embodiment as shown in Table 2, when the output line $S_{15}$ is activated, the output "0000" representing the shift number 0 is produced from the encoder 3. This output code controls the number of bits that are to be shifted by the variable bit length shifter 4. Therefore, Table 2 concretely shows the functions of the leading "1" detector circuit 2 and the encoder 3 in the normalizing circuit of the present invention. The data $D_{15}$ to $D_0$ of bits from the register 1 can be divided into 16 types depending upon the number of "0"s continuing from the MSB, except those in which the bits are all 0s.

The shift numbers for the normalization correspond to the 16 types of data as shown in Table 2, and the leading "1" detector circuit activates one of the 16 output lines $S_{15}$ to $S_0$. For example, when the data "0000010100111010" is applied from the register 1 to the leading "1" detector circuit 2, the output line $S_{10}$ only is activated. A unique conversion code consisting of four bits is produced by the encoder 3 responsive to each of the output lines $S_{15}$ to $S_0$ which are activated. When the data consisting of 16 bits to be normalized is "0000000001011011", this data of 16 bits is stored in the register 1, and the data of each of the bits are input to the leading "1" detector circuit 2. The leading "1" detector circuit 2 detects the data $D_6$ to be "1" which is closest to the MSB, and activates the output line $S_6$ only, leaving other output lines inactivated. Responsive to the activated output line $S_6$, the encoder 3 produces a conversion code consisting of four bits, i.e., produces "1001" which corresponds to the bit of data $D_6$. Owing to this output of the encoder 3, the variable bit length shifter 4 is so controlled as to effect the shifting leftwardly by nine bits. Therefore, the data stored in the register 1 is leftwardly shifted by nine bits through the shifter 4, and is normalized to 37 1011011000000000".

According to the present invention as will be obvious from the above-mentioned embodiment, the normalization processing can be performed at a high speed with a relatively simply hardware circuits.

Described below is an implementation of the leading "1" detector circuit 2 in the normalizing circuit of the present invention.

Figure 2:
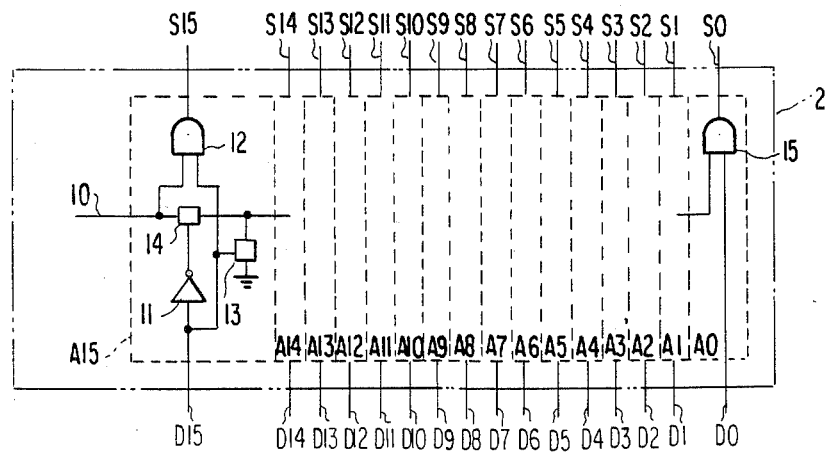
FIG. 2 is a diagram showing a leading "1" detector circuit in the normalizing circuit according to one embodiment of the present invention.

FIG. 2 is a diagram showing the setup of the leading "1" detector circuit in the normalizing circuit of the present invention. Here, the data output lines of the register 1 are simultaneously applied to the leading "1" detector circuit 2, and the contents of signals are denoted by $D_{15}$, $D_{14}$, - - - , $D_0$ from the MSB to conform to Table 2. The data $D_{15}$ to $D_0$ are input to sixteen logic blocks $A_{15}$, $A_{14}$, - - - , $A_0$. The logic blocks $A_{14}$ to $A_1$ have the same circuit setup as $A_{15}$. The logic blocks are serially connected to one another by a transmission signal line 10. As will be obvious from a logic block $A_{15}$, each logic block consists of an inverter 11, a two-input AND gate 12, and transfer gates 13 and 14. Here, the input data $D_{15}$ is applied to the inverter 11 and to the AND gate 12, and ia also applied to a control terminal of the gate 13 which is connected between the transmission line 10 and a reference potential (e.g. a ground). An output of the inverter 11 is applied to a control terminal of the transfer gate 14 which is inserted in the transmission line 10, that is, between one end of the line 10 and the other end of the line 10. To the transmission line 10, a high level voltage is applied from the left side of the drawing. Therefore, a high level is transferred through the line 10 via the gate 14, to the next logic block $A_{14}$, when the gate 14 is opened and the gate 13 is closed. It will be clear that the gates 13 and 14 are exclusively controlled by data $D_{15}$. These gates 13 and 14 may be respectively formed of a single MOS transistor. The AND gate 12 receives the input data $D_{15}$ and the potential level of the transmission line 10, in order to activate or not activate the output line $S_{15}$. That is, when both the transmission line 10 and the data $D_{15}$ have the level "1", the output line $S_{15}$ is activated to produce "1". In this case, the gate 13 is opened by the "1" level of the data $D_{15}$ and the transmission line between the gate 14 and the logic block $A_{14}$ is fixed to the ground level. Accordingly, the transmission line of the logic block $A_{14}$ of the next stage becomes "0" level. When the data $D_{15}$ having the level "0" is input, the output line $S_{15}$ is inactivated, i.e., produces "0". The transmission line 10 is not discharged, but the level "1" is sent to the logic block $A_{14}$ of the next stage. In case the transmission line 10 is first given the level "0", the output line $S_{15}$ is inactivated at all times irrespective of the content of data $D_{15}$, whereby "0" is produced. Namely, the transmission line level "0" is sent to the next stage. Similarly, the logic block $A_0$ of the final stage as counted from the MSB consists of a two-input AND gate 15 which receives the data $D_0$ and the transmission line level from the logic block $A_1$ of the proceding stage, and its output line $S_0$ is activated or inactivated.

Here, the transmission signal 10 having the level "1" is sent to the logic block $A_{15}$. Namely, the transmission signal on the line 10 is sent maintaining the level "1" up to the logic block which is assuming the condition "1" for the first time among the data $D_{15}$ to $D_0$ starting from the data $D_{15}$. The tramsmission signal on the line 10 is then sent with the level "0" to the subsequent logic blocks. Thus, starting from the data $D_{15}$, an activated output line signal "1" is produced from the logic block in which the data content has assumed "1" for the first time. The leading "1" detector circuit can be easily constituted in the form of a semiconductor chip.

Figure 3:
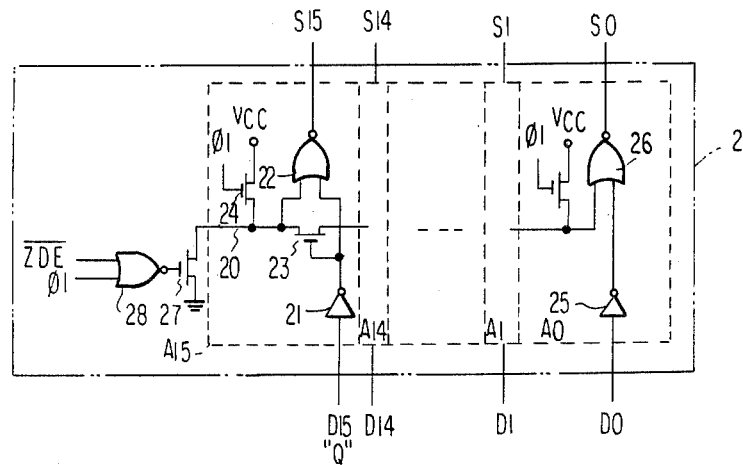
FIG. 3 is a diagram of a leading "1" detector circuit in the normalizing circuit constituted by n-channel MOS transistors according to another embodiment of the present invention.

FIG. 3 is a diagram in which the leading "1" detector circuit in the normalizing circuit is constituted by n-channel MOS transistor according to another embodiment of the present invention. Like the case of FIG. 2, data output lines of the register 1 are input to the leading "1" detector circuit 2, and the contents of signals are represented by $D_{15}$, $D_{14}$, - - - , $D_0$ from the MSB to conform with Table 2. The data $D_{15}$ to $D_0$ are input to logic blocks $A_{15}$, $A_{14}$, - - -, $A_0$, $A_{15}$ to $A_1$ L having the same circuit setup. These logic blocks are connected to each other by a transmission signal line 20. As represented by the logic block $A_{15}$, each logic block consists of an inverter 21 for inverting the code of data $D_{15}$, a two-input NOR gate 22 which receives the data sent from the inverter 21 and the transmission signal 20, and which produces an NOR output to the output line $S_{15}$, a transfer gate 23 which is turned on when the output signal of the inverter 21 is "1" level and is turned off when the output signal of the inverter 21 is "0" level, and a transistor 24 which precharges the input transmission signal line 20 to the level "1" during the period in which the basic clock $\phi$ 1 assumes the level "1". Further, the logic block $A_0$ which receives the data $D_0$ of the final stage as counted from the MSB consists of an inverter element 25 for inverting the data $D_0$, and a two-input NOR gate 26 which receives the data sent from the inverter 25 and the transmission signal 20 sent from the logic block $A_1$ of the preceding stage, and which produces the NOR output to the output line $S_0$. The transmission signal 20 input to the logic block $A_{15}$ is grounded via a transistor 27 which is controlled by the output of a two-input NOR gate 28 that receives a zero detection enable signal $\overline{ZDE}$ and the basic clock $\phi$ 1. When the basic clock $\phi$ 1 assumes the level "1", the two-input NOR gate 28 produces an output "0", whereby the transistor 27 is rendered nonconductive and the transistor 24 is rendered conductive so that the transmission signal 20 is charged to "1" in each of the logic blocks. Then, as the basic clock $\phi$ 1 assumes "0" and the zero detection enable signal $\overline{ZDE}$ assumes "0", the two-input NOR gate 28 produces the output "1", whereby the transistor 27 is rendered conductive, and the transmission signal 20 is turned to the level "0"

which is input to the logic block $A_{15}$. Here, if the data $D_{15}$ is "1", the output line $S_{15}$ of the two-input NOR gate 22 assumes the level "1", and the transfer gate transistor 23 is rendered non-conductive. Therefore, the transmission signal 20 of the level "1" is contained in the logic block $A_{14}$ of the next stage, and outputs which are all "0" are produced from the two-input NOR gates of the blocks subsequent to the logic block $A_{14}$. Conversely, if the data $D_{15}$ is "0", the two-input NOR gate 22 produces the level "0" output to render the output $S_{15}$ "0" level and the transistor 23 conductive. Therefore, the transmission signal 20 of the logic block $A_{14}$ of the next stage is turned to the level "0". Thus, the transmission signal 20 of the level "0" is transmitted up to the logic block in which the data is "1". Starting from the data $D_{15}$, therefore, the transmission signal 20 of the level "0" is sent up to the logic block in which the data has the content "1" for the first time. As the data "1" is encountered for the first time starting from the data $D_{15}$, the logic block produces an output signal of the level "1", and other blocks produce outputs of the level "0". According to this embodiment as described above, it is possible to detect the number of zeros continuing from the MSB at high speeds relying upon a relatively small amount of hardware.

Figure 4:
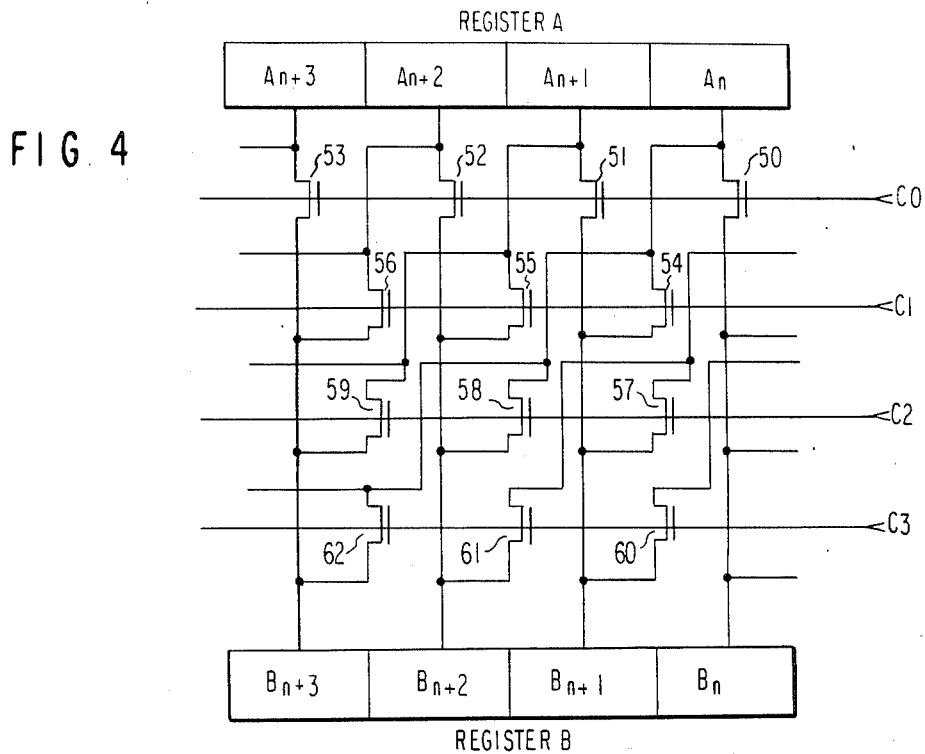
FIG. 4 is a diagram of an example of a bit shifter according to the present invention.
Figure 5:
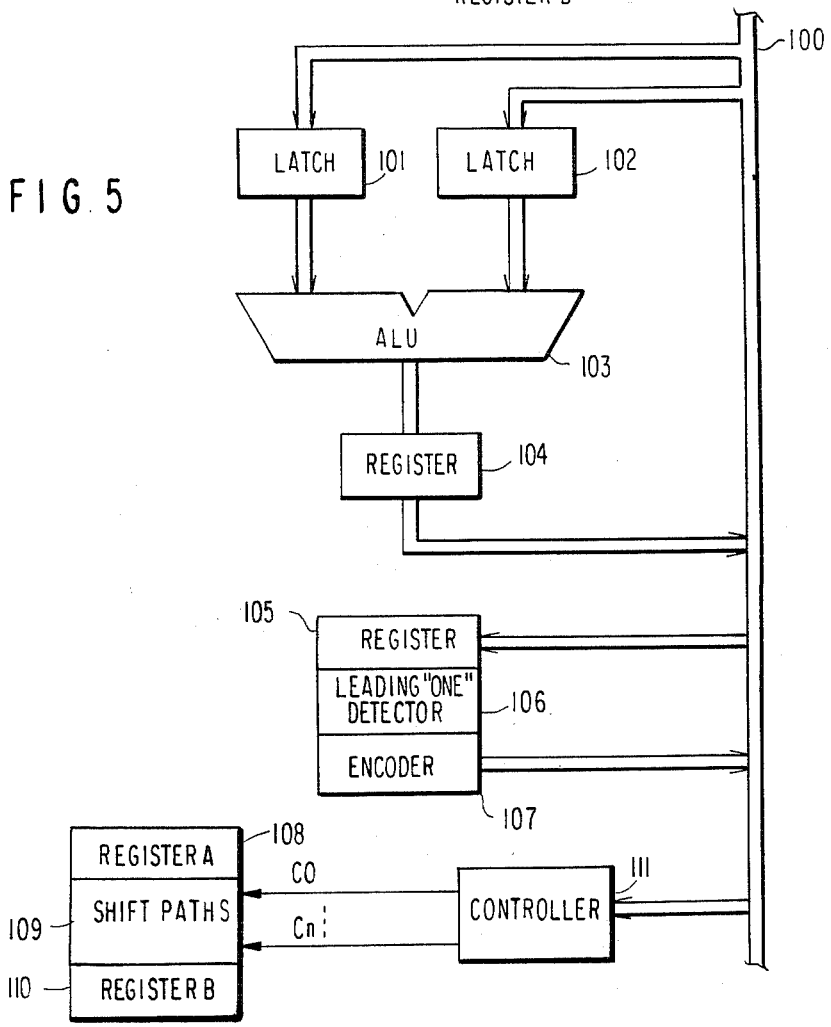
FIG. 5 is a system block diagram of an arithmetic computing apparatus according to an embodiment of the present invention.

A read only memory (ROM) may be used as the encoder 3 (FIG. 1). An output of the ROM is derived in accordance with the Table 2 as encoded output. Control Signals are generated in response to the encoded output by a controller (not shown in FIG. 1, but shown in FIG. 5 as 111) and applied to the variable bit length shifter 4 in FIG. 1. A preferred embodiment of the shifter 4 is shown in FIG. 4. It is noted that three bit shifter is shown in FIG. 4 in order to facilitate understanding of the invention. A register A is used to set a bit string to be normalized, while a register B is used to set a normalized bit string. The registers A and B include four stages $A_n$ to $A_{n+3}$, $B_n$ to $B_{n+3}$, respectively. The stage $A_n$ is coupled to stages $B_n$ to $B_{n+3}$ of the register B via transistor gates 50, 54, 58 and 62, respectively. The stage $A_{n+1}$ is coupled to stages $B_{n+1}$, $B_{n+2}$ and $B_{n+3}$ via transistor gates 51, 55 and 59. The stage $A_{n+2}$ is coupled to stage $B_{n+3}$ via a transistor gate 56. Four control signals $C_0$ to $C_3$ are applied to transistor gates as shown in FIG. 5. The control signal $C_0$ is applied to gates 50 to 53 in common when no bit is shifted. The control signal $C_1$ is applied to gates 54 to 56 in common when one bit is shifted. The control signal $C_2$ is applied to gates 57 to 59 in common when two bits are shifted. The control signal $C_3$ is applied to gates 60 to 62 in common when three bits are shifted simultaneously.

Now, when the control signal $C_0$ is applied, a bit string of the register A is set in the register B as they are at that time. That is, no bit shift is executed. However, when the control signal $C_1$ is applied, a bit of $A_n$ is set in $B_{n+1}$, a bit of $A_{n+1}$ being set in $B_{n+2}$, and a bit of $A_{n+2}$ being set in $B_{n+2}$. Therefore, one bit shift is executed. Thus, two bits shift and three bits shift are executed in response to control signals $C_2$ and $C_3$, respectively. These control signals are produced in accordance with the encoded output from the encoder 3 by a decoder or the like (not shown). Further, in FIG. 4, it will be clear that a bit shift operation from the register B to the Register A can also be executed in the same manner. Output of the leading "one" detector may be used as control signals. Output the encoder may be used to adjust of exponents.

FIG. 5 shows a block diagram of an arithmetic computing apparatus according to an embodiment of the present invention.

Two mantissa are set in latches 101 and 102 through a system bus 100. An arithmetic logic unit (ALU) 103 calculates the two mantissa of the latches 101 and 102 according to a designated command, and set a result in a register 104. The result is transferred to a register 105 and a register A through the bus 100 to normalize. The register 105 corresponds to the register 1 in FIG. 1. A leading "one" detector 106 and an encoder 107 correspond to the leading "one" detector circuit 2 and the encoder 3 in FIG. 1, respectively. An encoded output is transferred to a controller 111 through the bus 100. The controller produces a plurality of control signals $C_0$ to $C_n$ according to the encoded output. Consequently, the result set in the register A 108 is shifted through a selected shift path and is set in the register B. This shift operation can be executed within at least one shift clock.

The above-mentioned embodiments have dealt with the cases where the data have a length of 16 bits. The present invention, however, can also be applied to the cases where the data have increased lengths. When the data have extremely large lengths, however, the operation speed decreases with the above-mentioned embodiments since the propagation speed of transmission signal is delayed cumulatively through each of the stages. Under the conditions where the propagation speed decreases, the leading "1" detector circuit shown in FIG. 6 can be effectively utilized. Described below is an embodiment in which the data has a length of 64 bits.

Figure 6:
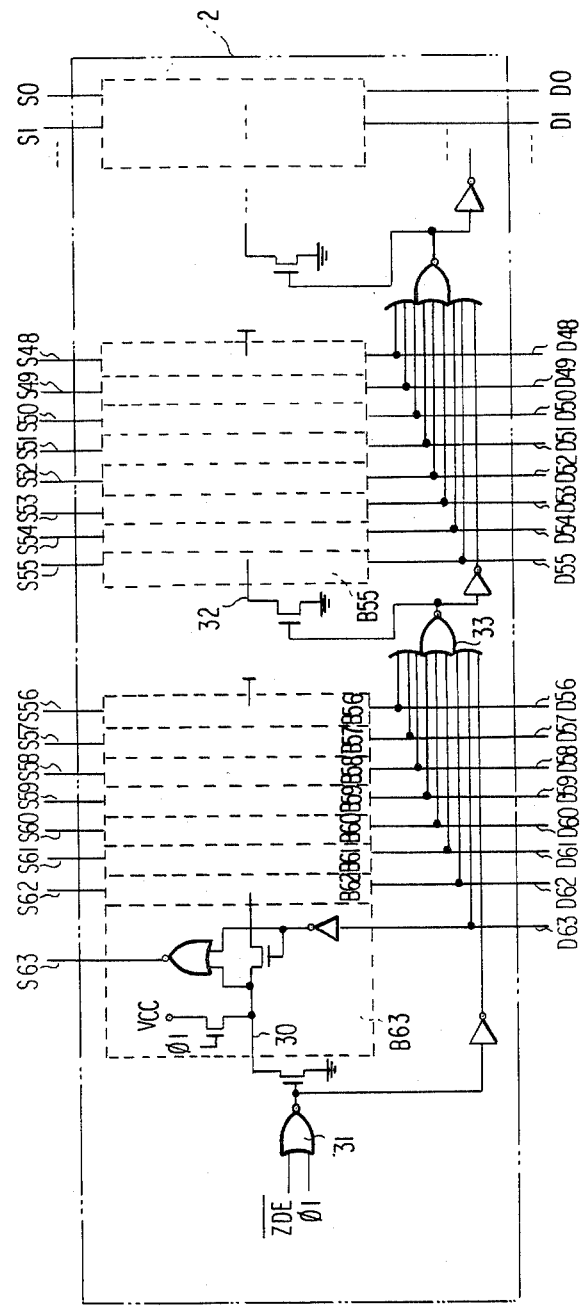
FIG. 6 is a diagram showing a leading "1" detector circuit in the normalizing circuit according to a further embodiment of the present invention.

FIG. 6 is a diagram showing the arrangement of the leading "1" detector circuit in the normalizing circuit according to a further embodiment of the present invention. The input data are successively denoted by $D_{63}$, $D_{62}$, - - - , $D_0$ from the MSB, being grouped into units each consisting of eight bits from the data $D_{63}$ of the MSB. The logic blocks corresponding to the individual data are constructed quite in the same manner as the logic blocks in FIG. 3. A transmission signal 30 of the logic block $D_{63}$ which receives the data $D_{63}$ is controlled by the output of a two-input NOR gate 31 which receives the zero detection enable signal $\overline{ZDE}$ and the basic clock $\phi$ 1. A transmission signal 32 of the logic block $B_{55}$ which receives the next data $D_{55}$ is controlled by the output of a nine-input NOR gate 33 which receives the inverted output of the two-input NOR gate 31 and the data $D_{63}$, $D_{62}$, $D_{61}$, $D_{60}$, $D_{59}$, $D_{58}$, $D_{57}$ and $D_{56}$. Thereafter, a transmission signal of the next stage is controlled by the result of NOR of data bus of eight bits and the input transmission signal, in the same manner as described above. Therefore, the propagation of transmission signals can be suppressed to a maximum of seven (8−1) stages.

According to this embodiment as described above, the number of "0"s continuing from the MSB can be detected at high speeds even for the data having large bit lengths, by producing a relatively small amount of hardware.

The above-mentioned embodiments have dealt with the leading "1" detector circuits which find the number of "0" continuing from the MSB. However, the leading "1" can also be detected easily even by finding the number of "1"s continuing from the MSB, contrary to the above-mentioned method. The object can also be achieved by finding the number of "0"s or "1"s continuing from the least significant bit (LSB). These detector circuits can be easily realized by slightly modifying the circuits of the above-mentioned embodiments.

According to the present invention as described above in detail, a normalizing circuit which operates at high speed is obtained by using a simply constructed leading "1" detector circuit and bit shifter.

What is claimed is:

1. A leading "one" detector, connected to a source of a transmission signal of a first level, for detecting the position of a leading "one" in a bit string, comprising:
a plurality of logic circuits connected in series, to each of which a respective bit of the bit string is applied as a first input,
the first of said logic circuits receiving at a second input said transmission signal of said first level from said source and generating an output transmission signal, each other logic circuit in said series receiving, as a second input, an output transmission signal from a preceding logic circuit, all said logic circuits including a first output, each of said logic circuits except the last one further including a second output and generating at said second output an output transmission signal, each of said logic circuits except the last one having means for transferring the input transmission signal at its second input to its second output as its output transmission signal when the bit applied to its first input is not "one" and, inhibiting transmission of the input transmission signal at its second input to its second output and generating an output transmission signal of a second level different from said first level at its second output when the bit applied to its first input is "one", whereby said transmission signal of said first level from said source is transmitted to the second input of the logic circuit to which the leading "one" bit is applied and the input transmission signal at the second input of the less significant logic circuit with respect to said leading "one" logic circuit becomes of said second level.

2. The leading "one" detector as claimed in claim 1, wherein each of said logic circuits, except the last of said logic circuits, includes transfer gate means connected between the second input and the second output and means for connecting the second output to a voltage source of said second level, the transfer gate means of such a logic circuit that receives at its first input a logic "one" bit being made non-conductive, thereby disconnecting all of the succeeding logic circuits in sequence from said source of transmission signal of said first level.

3. The leading "one" detector as claimed in claim 2, wherein each of said logic circuits has an AND gate having its one input terminal coupled to the first input and its other input terminal coupled to the second input of its respective logic circuit.

4. The leading "one" detector as claimed in claim 1, wherein each of said logic circuits comprises an inverter and a NOR gate having its one input terminal coupled to the first input via said inverter and its other input terminal coupled to the second input.

5. The leading "one" detector as claimed in claim 1, wherein each of said logic circuits except for the least significant logic circuit has a transfer gate connected between the second input thereof and the output thereof, said transfer gate being turned on by a logical "zero" of the corresponding bit received at the first input and being turned off by a logical "one" of said corresponding bit.

6. The leading "one" detector as claimed in claim 5, wherein each of said logic circuits has an inverter coupled at its input end to the first input of the logic circuits and at its output end to said transfer gate, a NOR gate having a first input end coupled to said output end of said inverter and a second input end coupled to said second input of the logic circuit and a means for precharging said second input of the logic circuit the second input of the most significant logic circuit being supplied with a logic "zero" signal.

7. The leading "one" detector as claimed in claim 5, wherein each of said logic circuits includes an AND gate having a first input end coupled to said first input of the logic circuit and a second input end coupled to said second input of the logic circuit and generating an output signal in the presence of a logical "one" at said first input and the transmission signal with the first level at said second input.

8. A normalizing circuit for shifting a bit string consisting of a plurality of binary bits and comprising a leading "one" detector for detecting a bit position of a leading "one" in said bit string and for generating a signal indicating the bit position of said leading "one" bit, means coupled to said leading "one" detector for producing a data representing a number of bits to be shifted in response to the signal generated by said leading "one" detector, and a shifter coupled to said producing means and shifting said bit string to an extent designated by said data;
said leading "one" detector including a plurality of logic circuits, each of said logic circuits receiving a respective bit of said bit string at a first input end and an input transmission signal at a second input end and producing an output signal at a first output end when a leading "one" signal is applied, each of said logic circuits except one receiving the least significant bit of said bit string generating an output transmission signal at a second output end, the output transmission signal of one logic circuit being applied to the second input end of the succeeding logic circuit as the input transmission signal thereto, the logic circuit to which the leading "one" bit is applied and its succeeding logic circuit or circuits generating a first level of output transmission signal at said second output end, the other logic circuit or circuits generating a second level of output transmission signal at said second output end, said first level being different from said second level, whereby only that logic circuit which receives the leading "one" bit and the transmission signal having said first level generates an output signal at said first output end as said signal indicating the bit position of said leading "one" bit.

9. A leading "one" detector for detecting the position of a leading "one" bit of a bit string, comprising a plurality of logic circuits arranged in serial and means for generating a transmission signal with a first level, each of the logic circuits having a first input end and receiving a respective bit of the bit string, a second input end, a first output end, a second output end, a first circuit coupled to said first and second input ends and said second output end, and a second circuit coupled to said first and second input ends and said first output end, a first means for coupling said generating means to the second input end of a first logic circuit of said plurality of logic circuits, a second means for coupling the second output end of a preceding logic circuit to the second input end of a succeeding logic circuit, the first circuit of each logic circuit having a switching means which is turned on to electrically couple the second input end to the second output end when a logic "zero" bit is applied at the first input end and is turned off to stop the transfer of a transmission signal with the first level to a succeeding logic circuit or circuits when a logic "one" bit is applied at the first input end, the second circuit of each logic circuit producing an output signal only when both the logic "one" bit and the transmission signal with the first level are applied at said first and second input ends, respectively, the output signal indicating the position of the leading "one" bit and being derived from the first output end.

10. A leading "one" detector as claimed in claim 9, wherein said second circuit of each logic circuit has an AND gate having its one input terminal coupled to the second input end and the other terminal coupled to the first input end, an output terminal of the AND gate being coupled to the first output end.

11. A leading "one" detector as claimed in claim 9, wherein the first circuit of each logic circuit has means for changing the level of the transmission signal with the first level applied to the second input end to a second level when the logic "one" bit is applied at the first input end.

12. A leading "one" detector as claimed in claim 9, wherein said generating means has a means for discharging an electric charge at the second input end of the first logic circuit to apply the transmission signal with the first level, the first circuit of each logic circuit having a means coupled to the second input end for precharging the second input end at the second level.

13. A leading "one" detector as claimed in claim 12, wherein the second circuit of each logic circuit further has an inverter coupled between the switching means and the first input end to invert a logic level of the logic bit applied at the first input end, the second circuit having a NOR gate whose one input terminal is coupled to an output end of the inverter and whose the other input terminal is coupled to the second input end, an output terminal of the NOR gate being coupled to the first output end.

14. A normalizing circuit for shifting a bit string consisting of a plurality of binary bits and comprising a leading "one" detector for detecting a bit position of a leading "one" in said bit string and for generating a signal indicating the bit position of said leading "one" bit, means coupled to said leading "one" detector for producing a data representing a number of bits to be shifted in response to the signal generated by said leading "one" detector, and a shifter coupled to said producing means and shifting said bit string to an extent designated by said data;

said leading "one" detector including a generating means for generating a transmission signal with a first level, a plurality of logic circuits, each of which has an input circuit for receiving a respective bit of said bit string, a gate circuit and a logic circuit, and means for coupling said generating means and all of the gate circuits of the logic circuits in serial, said gate circuit further coupled to said input circuit and being turned on when a logic "zero" bit is received at said input circuit and turned off when a logic "one" bit is received at the input circuit, said logic circuit having its one input end coupled to an input end of the gate circuit and the other input end coupled to the input circuit and generating said signal when the logic "one" bit and the transmission signal with the first level are applied thereto.

15. A leading "one" detector for detecting the position of a leading "one" bit in a bit string, comprising:
means for generating a transmission signal of a first level;
a plurality of logic circuits arranged in series to each of which a respective bit of the bit string is applied, each of the logic circuits except one receiving the least significant bit of said bit string having first and second input ends and first and second output ends, transfer gate means coupled between said second input end and said second output end, switch means coupled between said second output end and a source of a second potential different from said first potential, an AND gate having first and second input terminals coupled to said first and second input ends, respectively, and an output terminal coupled to said first output end, first control means coupled to said first input end for enabling said transfer gate means when said first input end receives a logic "zero" bit and second control means for enabling said switching means when said first input end receives a logic "one" bit;
means for applying said transmission signal to the second input end of a first logic circuit of said plurality of logic circuits, the second output end of one logic circuit being coupled to the second input end of its succeeding logic circuit, and means applying the respective bits in said bit string to the first input ends of the respective logic circuits, whereby the logic circuit receiving the leading "one" bit and the transmission signal generates at the first output end an output signal indicating the location of the leading "one" bit.

16. A leading "one" detector for detecting the position of a leading "one" bit in a bit string, comprising:
a plurality of logic circuits arranged in series to each of which a respective bit of the bit string is applied, each of the logic circuits having first and second input ends, first and second output ends, a transfer gate coupled between the second input end and the second output end, a switch element coupled between the second input end and a source of a first potential, a NOR gate having a first input terminal coupled to the second input end and a second input end, an inverter having an input terminal coupled to the first input end and an output terminal coupled to the second input terminal of the NOR gate, first control means for enabling the transfer gate when the first input end receives a logic "zero" bit and second control means for operatively enabling the switch element;
means for generating a transmission signal of a second level different from the first level;
means applying said transmission signal to the second input end of a first logic circuit of said plurality of logic circuits;
means for connecting the second output end of one logic circuit to the second input end of its succeeding logic circuit; and
means for applying the respective bit of said bit string to the first input ends of the respective logic circuits.

* * * * *

UNITED STATES PATENT AND TRADEMARK OFFICE
CERTIFICATE OF CORRECTION

PATENT NO. : 4,785,421
DATED : November 15, 1988
INVENTOR(S) : TAKAHASHI ET AL

It is certified that error appears in the above-identified patent and that said Letters Patent is hereby corrected as shown below:

COLUMN 5, LINE 24,    Delete "37"

COLUMN 6, LINE 35    Delete "L"

COLUMN 8, LINE 42    Delete "$D_{63}$" and insert --$B_{63}$--

Signed and Sealed this

Twenty-sixth Day of September, 1989

Attest:

DONALD J. QUIGG

Attesting Officer            Commissioner of Patents and Trademarks